United States Patent [19]

Jung

[11] Patent Number: 5,790,207

[45] Date of Patent: Aug. 4, 1998

[54] MOTION COMPENSATION METHOD FOR USE IN AN IMAGE ENCODING SYSTEM

[75] Inventor: Hae-Mook Jung, Seoul, Rep. of Korea

[73] Assignee: Daewoo Electronics, Co., Ltd., Seoul, Rep. of Korea

[21] Appl. No.: 616,020

[22] Filed: Mar. 14, 1996

[51] Int. Cl.$^6$ .................................................. H04N 7/36
[52] U.S. Cl. ........................ 348/699; 348/412; 348/413
[58] Field of Search .................................. 348/699, 412, 348/413, 415, 416, 420, 402, 411, 700; 382/326; H04N 7/36

[56] References Cited

U.S. PATENT DOCUMENTS

| | | | |
|---|---|---|---|
| 5,148,269 | 9/1992 | De Haan et al. | 348/699 |
| 5,508,744 | 4/1996 | Savatier | 348/699 |
| 5,537,155 | 7/1996 | O'Connell et al. | 348/699 |
| 5,539,469 | 7/1996 | Jung | 348/699 |
| 5,557,341 | 9/1996 | Weiss et al. | 348/699 |
| 5,561,475 | 10/1996 | Jung | 348/699 |
| 5,635,994 | 6/1997 | Drexler et al. | 348/699 |

Primary Examiner—Tommy P. Chin
Assistant Examiner—Luanne P. Din
Attorney, Agent, or Firm—Pennie & Edmonds LLP

[57] ABSTRACT

A method capable of improving the image quality comprises the steps of (a) detecting a motion vector for each search block in the current frame by using a block matching algorithm, (b) dividing a search block into a central region positioned at the center of the search block and a boundary region located outside the central region, (c) determining the motion vector for the search block as an optimum motion vector for the central region, and (d) determining a multiplicity of optimum motion vectors for the boundary region of the search block based on motion vectors for the search block and its one or more adjacent search blocks.

5 Claims, 3 Drawing Sheets

FIG.3

|  |  |  |  |
|---|---|---|---|
| SB1 | SB2 | | SB3 |
| | CR1-1 CR2-1 ER2-1 | | |
| | CR4-1 CR5-1 ER5-1 CR5-2 | | |
| SB4 | ER5-2 SB5 ER5-3 | | SB6 |
| | CR5-3 ER5-4 CR5-4 | | |
| SB7 | SB8 | | SB9 |

MOTION COMPENSATION METHOD FOR USE IN AN IMAGE ENCODING SYSTEM

FIELD OF THE INVENTION

The present invention relates to a motion compensation method for use in an image encoding system; and, more particularly, to an improved method capable of removing a blocking phenomenon occurring in a decoded image signal.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amount of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous frame, and predicting the current frame according to the motion flow of the object to produce a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of transform coefficient data.

Specifically, in the motion compensated DPCM, current frame data is predicted from previous frame data based on an estimation of the motion between the current and the previous frames. Such estimated motion may be described in terms of two dimensional motion vectors representing the displacement of pixels between the previous and the current frames.

Several methods for estimating the displacement of an object in a video sequence have been proposed. Generally, they can be classified into two types: pixel recursive algorithm and block matching algorithm. The present invention is primarily concerned with the block matching algorithm.

According to the block matching algorithm, a current frame is divided into a plurality of search blocks. The size of a search block typically ranges between 8×8 and 32×32 pixels. To determine motion vectors for a search block in the current frame, a similarity calculation is performed between the search block of the current frame and each of a plurality of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a candidate block which yields a minimum error function.

The encoded image data is transmitted through a conventional transmission channel to an image signal decoder included in an image signal decoding system, which performs an inverse process of the encoding operation to thereby reconstruct the original image data. However, the reconstructed image data normally exhibits an annoying artifact known as a blocking phenomenon wherein the border line of a block becomes visible at the receiving end. Such blocking effect occurs since a frame is encoded in the unit of blocks.

SUMMARY OF THE INVENTION

It is, therefore, a primary object of the invention to provide a motion compensation method for use in an image encoding system, capable of removing a blocking effect present at the boundary of a block of an image signal, to thereby improve the quality of an image produced by the system.

In accordance with the invention, there is provided a method for determining optimum motion vectors between a current frame and a preceding frame of video signals, wherein the current frame is divided into a plurality of search blocks of an identical size and the preceding frame includes a corresponding number of search regions, each search region having a multiplicity of candidate blocks of said identical size, which comprises the steps of:

(a) detecting a motion vector for each search block in the current frame by using a block matching algorithm;

(b) dividing a search block into a central region positioned at the center of the search block and a boundary region located outside the central region;

(c) determining the motion vector for the search block as an optimum motion vector for the central region; and (d) determining a multiplicity of optimum motion vectors for the boundary region of the search block based on motion vectors for the search block and its one or more adjacent search blocks.

BRIEF DESCRIPTION OF THE DRAWINGS

The above and other objects and features of the present invention will become apparent from the following description of preferred embodiments given in conjunction with the accompanying drawings, in which:

FIG. 3 represents a diagram for explaining the boundary region formation carried out in the inventive motion compensation device.

DETAILED DESCRIPTION OF THE PREFERRED EMBODIMENTS

Figure 1:
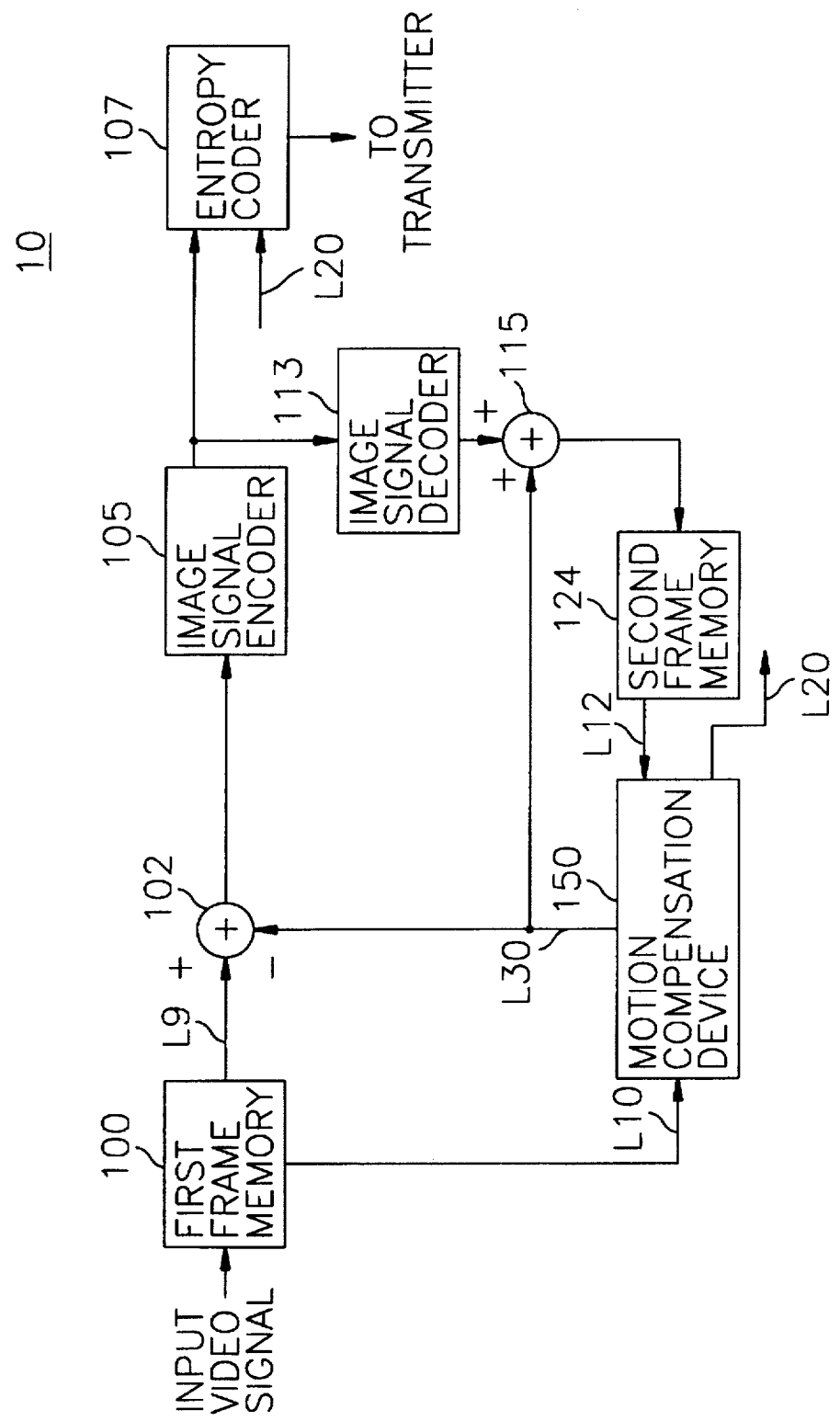
FIG. 1 offers a block diagram of an image signal encoding system employing a motion compensation device of the present invention.

Referring to FIG. 1, there is shown a block diagram of an encoding apparatus 10 for compressing a digital video signal, which comprises a motion compensation device 150 of the present invention, wherein the digital video signal includes a plurality of frames of video signals.

The encoding apparatus 10 comprises a first frame memory 100, a subtractor 102, an image signal encoder 105, an entropy coder 107, an image signal decoder 113, an adder 115, a second frame memory 124 and the motion compensation device 150.

A current frame included in an input video signal is stored at the first frame memory 100 which is connected to the subtractor 102 through a line L9 and to the motion compensation device 150 through a line L10. The stored current frame is read on a block-by-block basis wherein the block size typically ranges between 8×8 and 32×32 pixels.

The motion compensation device 150 of the present invention first detects a motion vector for each search block of the current frame through the use of the conventional block matching algorithm, the motion vector representing a spatial displacement between each search block in the current frame and a most similar candidate block thereto included in a corresponding search region of a previous frame from the second frame memory 124; and determines a multiplicity of optimum motion vectors for the pixels included in each search block based on motion vectors of the search block and its neighboring search blocks. Thereafter, the motion compensation device 150 retrieves corresponding pixel values of the previous frame from the second frame memory 124 by using the determined optimum motion vectors, thereby providing a predicted current frame. The motion vectors for the search blocks and the predicted current frame signal are fed to the entropy coder 107 and to the subtractor 102 and the adder 115, respectively. Details of the motion compensation device 150 will be described hereinafter with reference to FIGS. 2 and 3.

The predicted current frame signal from the motion compensation device 150 is subtracted from the current frame signal provided through the line L9 at the subtractor 102, and the resultant data, i.e., an error signal denoting a difference between pixel values of the current frame and of the predicted current frame, is dispatched to the image signal encoder 105, wherein the error signal is encoded into sets of quantized transform coefficients by using, e.g., a DCT and any of the known quantization methods.

Thereafter, the quantized transform coefficients are transmitted to the entropy coder 107 and the image signal decoder 113. The image signal decoder 113 converts the quantized transform coefficients from the image signal encoder 105 back to a reconstructed error signal by employing an inverse quantization and an inverse discrete cosine transform. At the adder 115, the reconstructed error signal received from the image signal decoder 113 and the predicted current frame signal provided from the motion compensation device 150 through the line L30 are combined to provide a reconstructed current frame signal to be stored as a previous frame signal in the second frame memory 124.

At the entropy coder 107, the quantized transform coefficients supplied from the image signal encoder 105 and the motion vectors transmitted from the motion compensation device 150 through the line L20 are coded together by using, e.g., a variable length coding technique. Thereafter, the coded signal is provided to a transmitter(not shown) for the transmission thereof.

Figure 2:
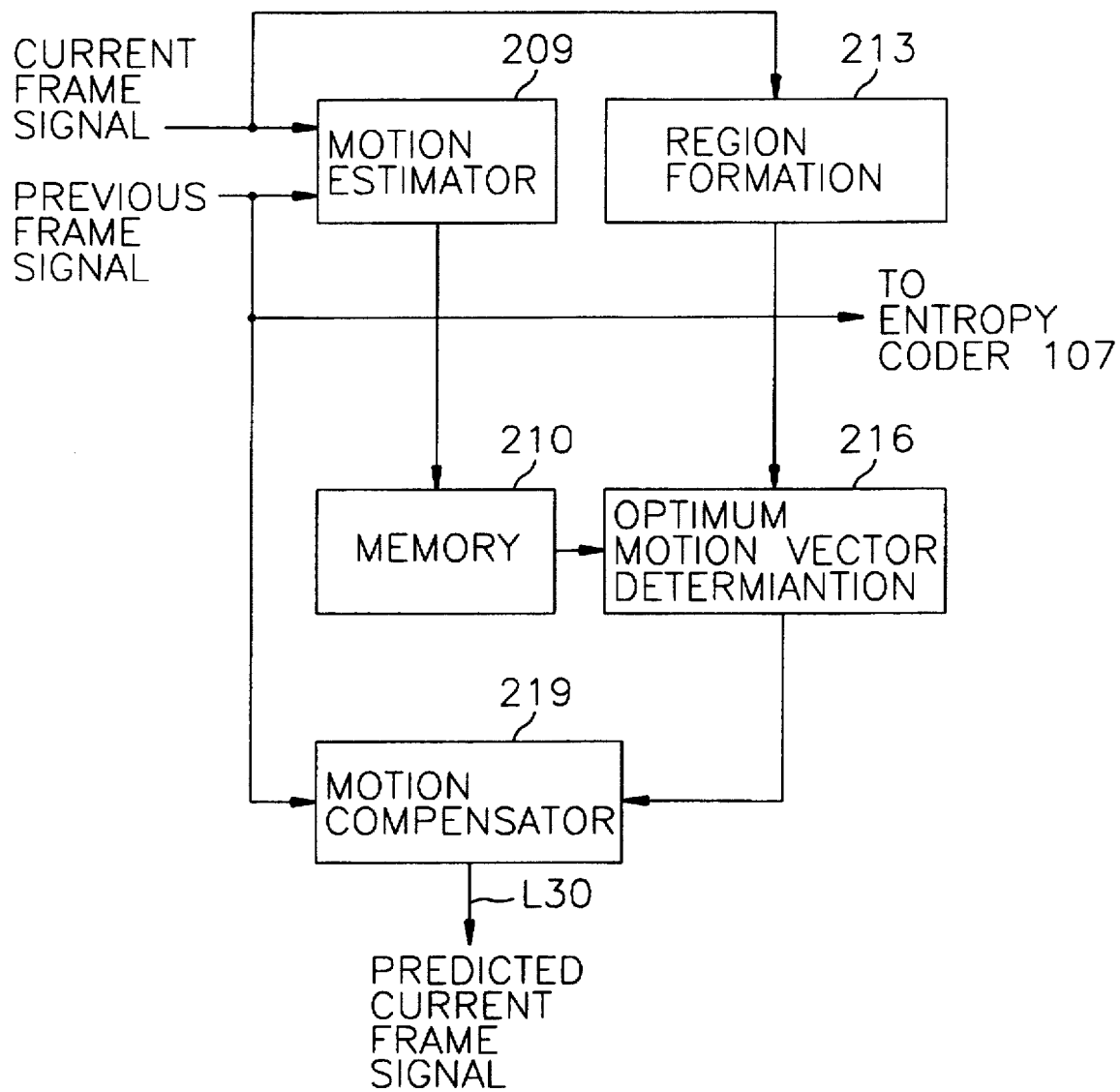
FIG. 2 shows a detailed block diagram of the motion compensation device of FIG. 1.

Referring now to FIG. 2, there are illustrated details of the motion compensation device 150 shown in FIG. 1. The motion compensation device 150 comprises a motion estimator 209, a memory 210, a region formation block 213, a optimum motion vector determination block 216 and a motion compensator 219.

First, the motion estimator 209 retrieves the current frame signal from the first frame memory 100 and the previous frame signal from the second frame memory 124 and detects, through the use of the conventional block matching technique well known in the art, a motion vector representing a spatial displacement between each search block in the current frame and a most similar block thereto in the previous frame. The motion vector for each search region from the motion estimator 209 is provided to the entropy coder 107 shown in FIG. 1 and the memory 210 wherein motion vectors for the search blocks of the current frame are stored.

In the meantime, the current frame signal is provided to the region formation block 213, wherein each of the search blocks is divided into a boundary region and a central region. In FIG. 3, there is illustrated a region formation scheme carried out at the region formation block 213 in accordance with the preferred embodiment of the present invention. As shown in FIG. 3, each search block, e.g., SB5 of 16×16 pixels, is divided into a central region CR5 of, e.g., 12×12 pixels located at the center of the search block SB5 and a boundary region consisting of pixels located outside the central region CR5 wherein the boundary region includes four edge regions ER5-1 to ER5-4, each consisting of 2×12 pixels, and four corner regions CR5-1 to CR5-4, each consisting of 2×2 pixels. Region information representing positions of the central, edge and corner regions in the current frame is provided to the optimum motion vector determination block 216.

The optimum motion vector determination block 216 retrieves the motion vectors of the search blocks in the current frame from the memory 210 and, in response to the region information provided from the region formation block 213, determines optimum motion vectors for the regions of each search block by using motion vectors of each search block and its neighboring search blocks. Specifically, an optimum motion vector for an edge region, e.g., ER5-1, positioned along a boundary between two search blocks, e.g., SB5 and SB2, is obtained by averaging motion vectors of two search blocks, i.e., SB5 and SB2. Similarly, optimum motion vectors for the edge regions ER5-2 to ER5-4 are determined by averaging motion vectors of the two search blocks SB5 and SB4, SB5 and SB6, and SB5 and SB8, respectively. On the other hand, an optimum motion vector for a corner region is obtained by averaging a motion vector for a search block including the corner region and those for search blocks adjoining the search block at the corner region. For instance, an optimum motion vector of the corner region CR5-1 is obtained by averaging motion vectors for search blocks SB1, SB2, SB4 and SB5. Likewise, optimum motion vectors for the corner regions CR5-2 to CR5-4 are determined based on motion vectors for search blocks SB2 to SB9. As for an optimum motion vector for a central region, e.g., CR5, a motion vector of a search block, e.g., SB5, which includes the central region CR5, is assigned as an optimum motion vector thereof.

In this manner and in accordance with the present invention, any corner regions adjoining each other, e.g., CR1-1,CR2-2, CR4-1 and CR5-1, having an identical optimum motion vector determined by averaging motion vectors of the search blocks, e.g., SB1, SB2, SB4 and SB5, including those corner regions and any adjoining edge regions, e.g., ER2-1 and ER5-1, share an optimum motion vector calculated by averaging motion vectors of the search blocks, e.g., SB2 and SB5, including those edge regions.

Optimum motion vectors for each of the search blocks of the current frame are then provided to a motion compensator 219.

The motion compensator 219 retrieves respective pixel values from the second frame memory 124 shown in FIG. 1 by using the optimum motion vectors provided from the optimum motion vector determination block 216, thereby providing the predicted current frame signal to the subtractor 102 and the adder 115 shown in FIG. 1 via the line L30.

At a digital video signal decoding apparatus corresponding to the encoding apparatus 10 of the present invention, the optimum motion vectors are reconstructed in a similar manner described with respect to the region formation block 213 and the optimum motion vector determination block based on the motion vectors transmitted from the encoding apparatus 10, thereby enabling the reconstruction of the current frame signal based on the transmitted coded signal representing the error signal and the motion vectors.

While the present invention has been described with respect to the particular embodiments, it will be apparent to those skilled in the art that various changes and modifications may be made without departing from the scope of the invention as defined in the following claims.

What is claimed is:

1. A method for determining optimum motion vectors between a current frame and a preceding frame of video signals, wherein the current frame is divided into a plurality of search blocks of an identical size and the preceding frame includes a corresponding number of search regions, each search region having a multiplicity of candidate blocks of said identical size, which comprises the steps of:

(a) detecting a motion vector for each search block in the current frame by using a block matching algorithm;

(b) dividing a search block into a central region positioned at a center of the search block and a boundary region located outside the central region, the boundary region having four edge regions and four corner regions, wherein each corner region is located at a corner of the search block and each edge region is positioned along an edge of the search block between two corner regions, said each corner region having three adjacent search blocks and said each edge region having one adjacent search block;

(c) determining the motion vector for the search block as an optimum motion vector for the central region; and (d) determining a multiplicity of optimum motion vectors for the boundary region of the search block based on motion vectors for the search block and its one or more adjacent search blocks, wherein an optimum motion vector for said each corner region is determined based on four motion vectors of its three adjacent search blocks and the search block and an optimum motion vector for said each edge region is determined based on two motion vectors of its one adjacent search block and the search block.

2. The method according to claim 1, the optimum motion vector for said each corner region is determined by averaging said four motion vectors, and the optimum motion vector for said each edge region is determined by averaging said two motion vectors.

3. The method according to claim 1, wherein the central region of the search block is completely surrounded by the boundary region of the search block.

4. The method according to claim 1, wherein the central region occupies more than one half of an area of the search block.

5. The method according to claim 1, wherein the four edge regions are of equal size, the four corner regions are of equal size, and the central region is larger than the size of either the edge regions or the corner regions.

* * * * *